(12) United States Patent
Zhu et al.

(10) Patent No.: US 11,726,397 B2
(45) Date of Patent: Aug. 15, 2023

(54) PROJECTION APPARATUS

(71) Applicant: IVIEW DISPLAYS (SHENZHEN) COMPANY LTD., Shenzhen (CN)

(72) Inventors: Weizhan Zhu, Shenzhen (CN); Xiaofeng Tang, Shenzhen (CN); Mingnei Ding, Shenzhen (CN); Steve Yeung, Hong Kong (CN); Zhiqiang Gao, Hong Kong (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 0 days.

(21) Appl. No.: 17/543,935

(22) Filed: Dec. 7, 2021

(65) Prior Publication Data

US 2022/0206378 A1 Jun. 30, 2022

Related U.S. Application Data

(63) Continuation of application No. PCT/CN2021/082772, filed on Mar. 24, 2021.

(30) Foreign Application Priority Data

Dec. 31, 2020 (CN) .......................... 202011638792.7

(51) Int. Cl.
*G03B 21/20* (2006.01)
*G03B 21/00* (2006.01)
*G02B 13/16* (2006.01)

(52) U.S. Cl.
CPC ........... *G03B 21/208* (2013.01); *G02B 13/16* (2013.01); *G03B 21/008* (2013.01); *G03B 21/2013* (2013.01); *G03B 21/2033* (2013.01)

(58) Field of Classification Search
CPC .... G03B 21/208; G03B 21/16; G03B 21/008; G03B 21/2013
See application file for complete search history.

(56) References Cited

U.S. PATENT DOCUMENTS

2016/0269698 A1* 9/2016 Gao .................... G03B 21/2066
2021/0072498 A1* 3/2021 Wei ........................... G02B 9/12

FOREIGN PATENT DOCUMENTS

CN 201376531 Y 1/2010
CN 102375236 A 3/2012
(Continued)

OTHER PUBLICATIONS

Translation of WO2022011899A1 (Year: 2023).*

*Primary Examiner* — Jerry L Brooks
(74) *Attorney, Agent, or Firm* — IPro, PLLC; Na Xu

(57) ABSTRACT

The present disclosure provides a projection apparatus. The projection apparatus includes: a light supply device, including an LED lamp and a collimator fly-eye lens, wherein lamp bodies of the LED lamp are arrayed and the LED lamp is capable of simultaneously emitting red, green, and blue light rays, and the collimator fly-eye lens is capable of collimating the light ray emitted by each of the lamp bodies; an optical path conversion device, configured to convert a direction of the light rays emitted by the light supply device; a DMD device, configured to process the light rays from the optical path conversion device and feed the processed light rays to the optical path conversion device; and a projection lens device; wherein the light rays transmitted by the optical path conversion device to the projection lens device to achieve image projection.

7 Claims, 2 Drawing Sheets

(56) References Cited

FOREIGN PATENT DOCUMENTS

| | | |
|---|---|---|
| CN | 103048862 A | 4/2013 |
| CN | 103376632 A | 10/2013 |
| CN | 103529629 A | 1/2014 |
| CN | 205374009 U | 7/2016 |
| CN | 107167997 A | 9/2017 |
| CN | 206472206 U | 9/2017 |
| CN | 208026987 U | 10/2018 |
| CN | 110058387 A | 7/2019 |
| JP | 2012037638 A | 2/2012 |
| WO | WO-2022011899 A1 * | 1/2022 |

* cited by examiner

PROJECTION APPARATUS

This application is based upon and claims priority to Chinese Patent Application No. 2020116387927, filed before China National Intellectual Property Administration on Dec. 31, 2020 and entitled "PROJECTION APPARATUS," the entire contents of which are incorporated herein by reference.

TECHNICAL FIELD

Embodiments of the present disclosure relate to the technical field of optical projection, and in particular, relate to a projection apparatus.

BACKGROUND

In recent years, due to the development and application of various handheld electronic devices, projection display devices are being designed to miniaturization and high quality in projection technologies. With advancements of LED light sources and the digital light processing (DLP) technology, DLP micro projectors have been developed rapidly and become popular projection displays. In 1987, Texas Instruments Incorporated (TI) invented digital micromirror device (DMD devices), such that the DLP technology was applied in the worldwide, which promoted the rise of the DLP micro projectors. The DMD device is a digital optical switch with binary pulse width modulation, and is the most complex optical switch device in the world. Thousands of micro square lenses are built on a chain structure over a static random-access memory (SRAM) to form the DMD device. Each lens is capable of switching on or off light of one pixel. The chain structure allows the lens to tilt between two states. The lens is "turned on" by a tilt angle+10 degrees. The lens is "turned off" by a tilt angle of −10 degrees, and the lens is in a "docked" state at 0 degrees.

During the practice of the present disclosure, the inventors have found that: An illumination optical system of a conventional DLP micro projector needs to be provided with a plurality of light sources and each of the light sources needs to be equipped with a collimator module. In this way, the structure of the conventional DLP micro projector is complex and thus the micro projector is bulky. Where the DLP micro projector needs to be widely used, the size and weight of the projection apparatus need to be reduced to ensure that the projection apparatus has high projection quality and is more portable.

SUMMARY

Embodiments of the present disclosure are intended to provide a projection apparatus, such that a size of the projection apparatus is reduced.

To solve the above technical problem, one technical solution employed by the embodiments of the present disclosure is a projection apparatus. The projection apparatus includes:

a light supply device, including an LED lamp and a collimator fly-eye lens, wherein lamp bodies of the LED lamp are arrayed and the LED lamp is capable of simultaneously emitting red, green, and blue light rays, and the collimator fly-eye lens is capable of collimating the light ray emitted by each of the lamp bodies;

an optical path conversion device, configured to convert a direction of the light rays emitted by the light supply device;

a DMD device, configured to process the light rays from the optical path conversion device and feed the processed light rays to the optical path conversion device; and a projection lens device;

wherein the light rays emitted from the light supply device are irradiated to the DMD device via the optical path conversion device, and processed by the DMD device, and the processed light rays are transmitted by the DMD device to the optical path conversion device and transmitted by the optical path conversion device to the projection lens device to achieve image projection.

Optionally, the LED lamp includes a plurality of Mini LEDs or a plurality of Micro LEDs that are arrayed.

Optionally, the optical path conversion device further includes a convergent lens and a converter lens, wherein the convergent lens is arranged between the collimator fly-eye lens and the converter lens.

Optionally, the converter lens is a triangular prism with a first surface and a second surface, wherein the first surface is parallel to the DMD device, and a normal of the second surface of the converter lens is coincident with a central axial line of the projection lens device, wherein the first surface is perpendicular to the normal of the second surface.

Optionally, the light supply device further includes a relay lens, wherein the relay lens is arranged between the collimator fly-eye lens and the convergent lens, and a central axis of the relay lens is coincident with a central axis of the collimator fly-eye lens.

Optionally, the light supply device further includes a light-homogenizing fly-eye lens, wherein the light-homogenizing fly-eye lens is arranged between the collimator fly-eye lens and the relay lens.

Optionally, a side from which the light ray exits from the convergent lens and a side on which an oblique edge of the converter lens is positioned are arranged to form an angle therebetween.

Optionally, the projection lens device includes a first teleconverter module and a second teleconverter module, wherein the first teleconverter module is configured to receive the light ray from the converter lens and transmit the light ray to the second teleconverter module.

Optionally, the first teleconverter module includes a first lens, a second lens, a third lens, and a fourth lens, wherein the first lens, the second lens, the third lens, and the fourth lens are successively arranged and central axes of the first lens, the second lens, the third lens, and the fourth lens are coincident;

wherein the first lens, the second lens, and the fourth lens are convex lenses, and the third lens is a concave lens.

Optionally, the second teleconverter module includes a fifth lens, a sixth lens, and a projection lens, wherein the fifth lens, the sixth lens, and the projection lens are successively arranged and central axes of the fifth lens, the sixth lens, and the projection lens are coincident.

In the embodiment of the present disclosure, with configuration of the LED lamp capable of simultaneously emitting red, green, and blue light rays, and the collimator fly-eye lens, the light ray emitted by each of the lens bodies of the LED lamp are collimated by the collimator fly-eye lens, such that the volume of the light supply device is reduced, and the effects of further reducing the size and weight of the projection apparatus are achieved.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For better understanding of the present disclosure, the present disclosure is described in detail with reference to attached drawings and specific embodiments. It should be noted that, when an element is defined as "being secured or fixed to" another element, the element may be directly positioned on the element or one or more centered elements may be present therebetween. When an element is defined as "being connected or coupled to" another element, the element may be directly connected or coupled to the element or one or more centered elements may be present therebetween. As used herein, the terms "vertical," "horizontal," "left," "right," and similar expressions are for illustration purposes.

Unless the context clearly requires otherwise, throughout the specification and the claims, technical and scientific terms used herein denote the meaning as commonly understood by a person skilled in the art. Additionally, the terms used in the specification of the present disclosure are merely for describing the objectives of the specific embodiments, and are not intended to limit the present disclosure. As used herein, the term "and/or" in reference to a list of one or more items covers all of the following interpretations of the term: any of the items in the list, all of the items in the list and any combination of the items in the list.

Figure 1:
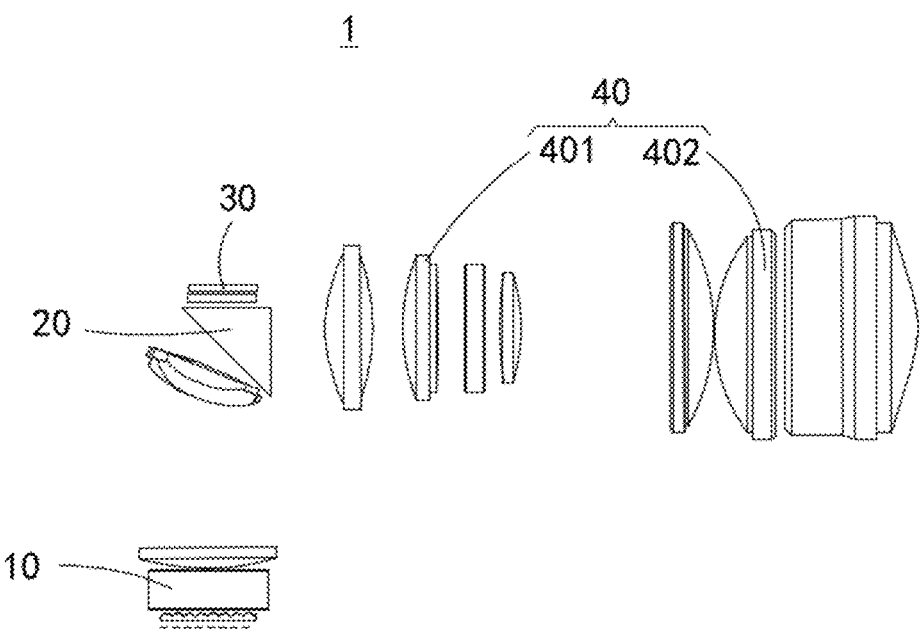
FIG. 1 is a schematic overall view of a projection apparatus according to an embodiment of the present disclosure.

Referring to FIG. 1, a projection apparatus 1 includes a power supply device 10, an optical path conversion device 20, a DMD device 30, and a projection lens device 40. The light supply device 10 is configured to supply a light source. The optical path conversion device 20 is arranged between the light supply device 10 and the DMD device 30. The projection apparatus 1 is configured to project light rays processed by the DMD device 30. The light rays emitted from the light supply device 10 are irradiated to the optical path conversion device 20, and the optical path conversion device 20 transmits the light rays to the DMD device 30. The DMD device 30 receives the light rays from the optical path conversion device 20 and processes the light rays, and then the DMD device 30 transmits the processed light rays to the optical path conversion device 20. The optical path conversion device 20 transmits the light rays processed by DMD device 30 to the projection lens device 40. The projection lens device 40 performs projection imaging for the light rays processed by the DMD device 30.

Figure 2:
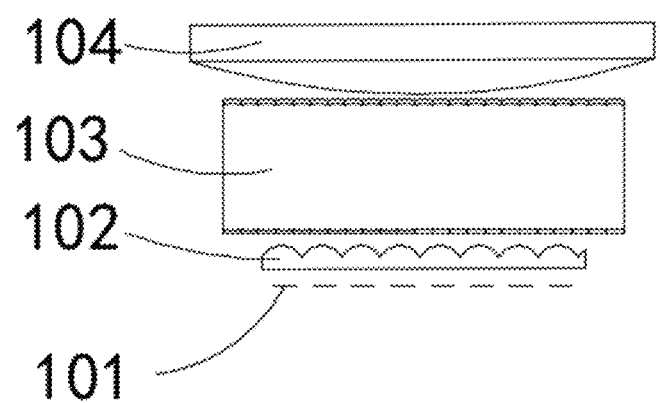
FIG. 2 is a schematic view of a light supply device of the projection apparatus according to an embodiment of the present disclosure.

With respect to the light supply device 10, referring to FIG. 2, the light supply device 10 includes an LED lamp 101, a collimator fly-eye lens 102, a relay lens 104, and a light-homogenizing fly-eye lens 103. The LED lamp 101, the collimator fly-eye lens 102, and the relay lens 104 are successively arranged, and the light-homogenizing fly-eye lens 103 is arranged between the collimator fly-eye lens 102 and the relay lens 104, wherein a central axis of the collimator fly-eye lens 102 is coincident with a central axis of the relay lens 104.

Specifically, the LED lamp 101 includes a plurality of Mini LEDs that are arrayed. The light ray emitted by one of the Mini LEDs is red light, green light, or blue light. The collimator fly-eye lens 102 is capable of collimating the light ray emitted by each of the Mini LEDs. The light rays collimated by the collimator fly-eye lens 102 are irradiated to the light-homogenizing fly-eye lens 103. The light-homogenizing fly-eye lens 103 light-homogenizes the light rays passing through the light-homogenizing fly-eye lens 103, such that the light rays passing through the light-homogenizing fly-eye lens 103 may achieve energy uniformity, and thus the quality of the light rays in response to exiting from the light-homogenizing fly-eye lens 103 is improved. The principle of the light-homogenizing fly-eye lens 103 is as follows: The light-homogenizing fly-eye lens 103 is composed of two rows of fly-eye lenses, and the light rays parallel to the optical axis pass through the first lens and are focused on the center of the second lens. Each small lens of the second row of fly-eye lenses overlaps and integrates the light rays emitted from the small lens corresponding to the first row of the fly-eye lenses. The first row of fly-eye lenses divides an entire wide light ray of the light source into a plurality of thin light rays, and non-uniformity of a vertical axis is present in the extent of each of the thin light rays. Since the thin light rays at symmetrical positions are superimposed, the non-uniformity of the vertical axes of the thin light rays may be compensated, and thus the light energy in an entire aperture is uniform. It should be noted that the Mini LED used in the embodiment of the present disclosure is composed of pixel particles with a size of 0.5 mm to 1.2 mm, and the collimator fly-eye lens 102 collimates each of the pixel particles. The LED lamp 101 is capable of simultaneously emitting red, green, and blue light rays, and when the red, green, and blue light rays emitted from the LED lamp 101 are collimated by the collimator fly-eye lens 102, the collimated light rays reach the DMD device 30 via the optical path conversion device 20. In this way, the conventional separate three primary color light sources and three sets of collimator mechanisms corresponding thereto are replaced, thereby reducing the size of the light supply device 10.

In some embodiments, the LED lamp includes a plurality of Micro LEDs that are arrayed, wherein the plurality of Micro LEDs are composed of pixel particles with a size of 0.05 mm or even smaller.

In some embodiments, the light supply device 10 may also be provided with no light-homogenizing fly-eye lens 103, and the light rays emitted by the LED lamp 101 may be collimated by the collimator fly-eye lens 102 and then reach the DMD device 30 via the optical path conversion device 20.

Figure 3:
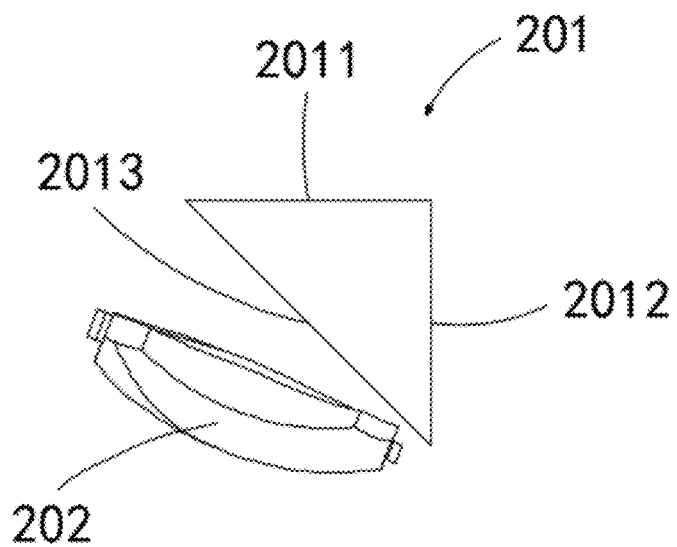
FIG. 3 is a schematic view of an optical path conversion device of the projection apparatus according to an embodiment of the present disclosure.

With respect to the optical path conversion device 20, referring to FIG. 1 and FIG. 3, the optical path conversion device 20 includes a convergent lens 202 and a converter lens 201, wherein the convergent lens 202 is arranged between the collimator fly-eye lens 102 and the converter lens 201. Specifically, the converter lens 201 is a triangular prism, wherein a first surface 2011 of the converter lens 201 is parallel to the DMD device 30, and a normal of a second surface 2012 of the converter lens 201 is coincident with a central axial line of the projection lens device 40. The first surface 2011 is perpendicular to the normal of the second surface 2012. A third surface 2013 is connected to the first surface 2011 and the second surface 2012, wherein an end surface of the third surface 2013 facing the convergent lens 202 is a transmissive surface, and a surface of the third surface 2013 facing away from the convergent lens 202 is a reflective surface. The convergent lens 202 converges the light rays emitted from the light supply device 10, and the converged light rays are incident to the converter lens 201 through the third surface 2013. The converter lens 201 refracts the incident light rays and finally the light rays reach the DMD device 30. The DMD device 30 processes the light rays refracted by the converter lens 201, and the processed light rays are incident to the converter lens 201 from the first surface 2011. The light rays processed by the DMD device 30 enter from the first surface 2011, reach the reflective surface of the third surface 2013 of the converter lens 201, are reflected by the reflective surface, and finally exit from the converter lens 201 through the second surface 2012. It should be noted that by observing the principle of total reflection of light, the converter lens 201 reflects the light rays transmitted from the first surface 2011 to the reflective surface of the third surface 2013 out of the second surface 2012.

In addition, a side from which the light ray exits from the convergent lens 202 and a side on which an oblique edge of the converter lens 202 is positioned are arranged to form an angle therebetween, that is, the side from which the light ray exits from the convergent lens 202 and the third surface 2013 are arranged to form an angle therebetween. As a result, in response to being converged by the convergent lens 202, the light rays emitted from the light supply device 10 are all incident to a limited range of the DMD device 30 through the refraction of the converter lens 201.

Further, the light supply device 10 further includes a relay lens 104, wherein the relay lens 104 is arranged between the collimator fly-eye lens 102 and the convergent lens 202, and a central axis of the relay lens 104 is coincident with a central axis of the collimator fly-eye lens 103. The relay lens 104 and the convergent lens 202 effect together to extend the light rays passing through the relay lens 104 and the convergent lens 202, thereby enhancing the quality of the light rays emitted from the LED lamp 101.

Figure 4:
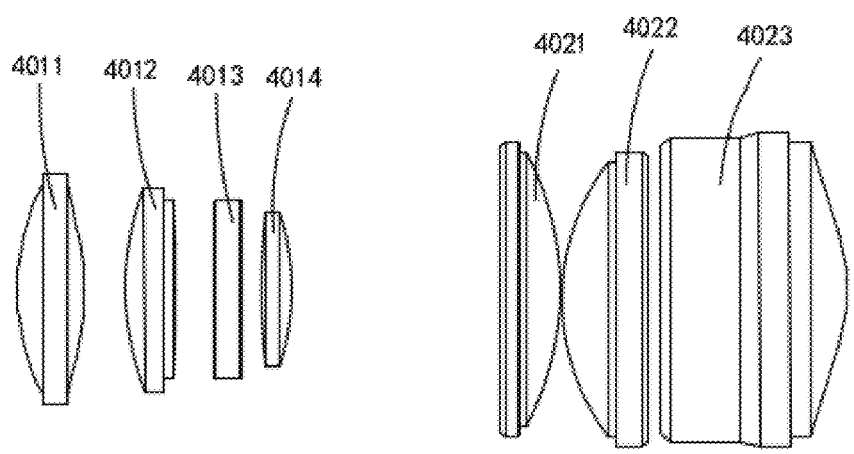
FIG. 4 is a schematic view of a projection lens device of the projection apparatus according to an embodiment of the present disclosure.

Referring to FIG. 1 and FIG. 4, with respect to the projection lens device 40, the projection lens device 40 includes a first teleconverter module 401 and a second teleconverter module 402, wherein the first teleconverter module 401 is configured to receive the light rays from the converter lens 201 and transmit the light rays to the second teleconverter module 402. The first teleconverter module 401 includes a first lens 4011, a second lens 4012, a third lens 4013, and a fourth lens 4014, wherein the first lens 4011, the second lens 4012, the third lens 4013, and the fourth lens 4014 are successively arranged and central axes of the first lens 4011, the second lens 4012, the third lens 4013, and the fourth lens 4014 are coincident. The first lens 4011, the second lens 4012, and the fourth lens 4014 are convex lenses, and the third lens 4013 is a concave lens. The second teleconverter module 402 includes a fifth lens 4021, a sixth lens 4022, and a projection lens 4023, wherein the fifth lens 4021, the sixth lens 4022, and the projection lens 4023 are successively arranged and central axes of the fifth lens 4021, the sixth lens 4022, and the projection lens 4023 are coincident. The light rays processed by the DMD device 30 are reflected by the converter lens 201 to first teleconverter module 401, such that the image is extended for one time. In the case that the light rays emitted from the first teleconverter module 401 are incident to the second teleconverter module 402, the image is extended for another time, and the image is output. In this way, the length of the entire projection lens device 40 is reduced.

In some embodiments, the lenses in the first teleconverter module 401 and the second teleconverter module 402 are both plastic lenses, and are prepared by an injection molding process. As a result, the weight of the projection lens device 40 may be reduced, and an overall weight of the projection apparatus 1 is reduced and the portability of the projection apparatus 1 is improved.

In the embodiment of the present disclosure, with configuration of the LED lamp 101 capable of simultaneously emitting red, green, and blue light rays, and the collimator fly-eye lens 102, the light ray emitted by each of the lens bodies of the LED lamp 101 is collimated by the collimator fly-eye lens 102, such that the volume of the light supply device 10 is reduced, and the effects of further reducing the size and weight of the projection apparatus 1 are achieved.

It should be noted that the specification and drawings of the present disclosure illustrate preferred embodiments of the present disclosure. However, the present disclosure may be implemented in different manners, and is not limited to the embodiments described in the specification. The embodiments described are not intended to limit the present disclosure, but are directed to rendering a thorough and comprehensive understanding of the disclosure of the present disclosure. In addition, the above described technical features may incorporate and combine with each other to derive various embodiments not illustrated in the above specification, and such derived embodiments shall all be deemed as falling within the scope of the specification of the present disclosure. Further, a person skilled in the art may make improvements or variations according to the above description, and such improvements or variations shall all fall within the protection scope as defined by the claims of the present disclosure.

What is claimed is:

1. A projection apparatus, comprising:
  a light supply device, comprising an LED lamp and a collimator fly-eye lens, wherein lamp bodies of the LED lamp are arrayed and the LED lamp is capable of simultaneously emitting red, green, and blue light rays, and the collimator fly-eye lens is capable of collimating the light ray emitted by each of the lamp bodies; the LED lamp comprises a plurality of Mini LEDs or a plurality of Micro LEDs that are arrayed, the Mini LEDs used is composed of pixel particles with a size of 0.5 mm to 1.2 mm, the Micro LEDs are composed of pixel particles with a size of 0.05 mm, and the collimator fly-eye lens collimates each of the pixel particles; the light supply device further comprises a relay lens, wherein the relay lens is arranged between the collimator fly-eye lens and the convergent lens, and a central axis of the relay lens is coincident with a central axis of the collimator fly-eye lens; the light supply device further comprises a light-homogenizing fly-eye lens, wherein the light-homogenizing fly-eye lens is arranged between the collimator fly-eye lens and the relay lens, the light-homogenizing fly-eye lens is composed of two rows of fly-eye lenses, and the light rays parallel to the optical axis pass through the first lens and are focused on the center of the second lens, each small lens of the second row of fly-eye lenses overlaps and integrates the light rays emitted from the small lens corresponding to the first row of the fly-eye lenses;
  an optical path conversion device, configured to convert a direction of the light rays emitted by the light supply device;

a digital micromirror device (DMD device), configured to process the light rays from the optical path conversion device and feed the processed light rays to the optical path conversion device; and a projection lens device;

wherein the light rays emitted from the light supply device are irradiated to the DMD device via the optical path conversion device, and processed by the DMD device, and the processed light rays are transmitted by the DMD device to the optical path conversion device and transmitted by the optical path conversion device to the projection lens device to achieve image projection.

2. The projection apparatus according to claim 1, wherein the optical path conversion device further comprises a convergent lens and a converter lens, wherein the convergent lens is arranged between the collimator fly-eye lens and the converter lens.

3. The projection apparatus according to claim 2, wherein the converter lens is a triangular prism with a first surface and a second surface, wherein the first surface is parallel to the DMD device, and a normal of the second surface of the converter lens is coincident with a central axial line of the projection lens device, wherein the first surface is perpendicular to the normal of the second surface.

4. The projection apparatus according to claim 3, wherein a side from which the light ray exits from the convergent lens and a side on which an oblique edge of the converter lens is positioned are arranged to form an angle therebetween.

5. The projection apparatus according to claim 4, wherein the projection lens device comprises a first teleconverter module and a second teleconverter module, wherein the first teleconverter module is configured to receive the light ray from the converter lens and transmit the light ray to the second teleconverter module.

6. The projection apparatus according to claim 5, wherein the first teleconverter module comprises a first lens, a second lens, a third lens, and a fourth lens, wherein the first lens, the second lens, the third lens, and the fourth lens are successively arranged and central axes of the first lens, the second lens, the third lens, and the fourth lens are coincident;

wherein the first lens, the second lens, and the fourth lens are convex lenses, and the third lens is a concave lens.

7. The projection apparatus according to claim 6, wherein the second teleconverter module comprises a fifth lens, a sixth lens, and a projection lens, wherein the fifth lens, the sixth lens, and the projection lens are successively arranged and central axes of the fifth lens, the sixth lens, and the projection lens are coincident.

* * * * *